United States Patent
Lovmand

(10) Patent No.: US 12,055,127 B2
(45) Date of Patent: Aug. 6, 2024

(54) MONITORING SYSTEM FOR WIND TURBINES

(71) Applicant: SCADA INTERNATIONAL A/S, Silkeborg (DK)

(72) Inventor: Bo Lovmand, Hadsten (DK)

(73) Assignee: SCADA INTERNATIONAL A/S, Silkeborg (DK)

( * ) Notice: Subject to any disclaimer, the term of this patent is extended or adjusted under 35 U.S.C. 154(b) by 336 days.

(21) Appl. No.: 17/685,810

(22) Filed: Mar. 3, 2022

(65) Prior Publication Data
US 2022/0282702 A1    Sep. 8, 2022

(51) Int. Cl.
*F03D 7/02* (2006.01)
*F03D 7/04* (2006.01)
(Continued)

(52) U.S. Cl.
CPC .......... *F03D 7/028* (2013.01); *F03D 7/0264* (2013.01); *F03D 7/048* (2013.01); *F03D 17/00* (2016.05); *H02J 3/381* (2013.01); *H02J 2300/28* (2020.01)

(58) Field of Classification Search
CPC ........ F03D 7/028; F03D 17/00; F03D 7/0264; F03D 7/048; H02J 3/381
(Continued)

(56) References Cited

U.S. PATENT DOCUMENTS

2015/0073610 A1* 3/2015 Schnetzka ............... G05B 15/02
                                                    700/287
2020/0132049 A1* 4/2020 Feltes ..................... F03D 7/028
(Continued)

FOREIGN PATENT DOCUMENTS

WO    WO-2014014792 A1 *  1/2014 ............. G05B 15/02

*Primary Examiner* — Mohammad Ali
*Assistant Examiner* — Joshua T Sanders
(74) *Attorney, Agent, or Firm* — Cermak & McGowan LLP; Malcolm K. McGowan

(57) ABSTRACT

The invention relates to a monitoring system for monitoring the operation of a number N of wind turbines $WT_1$, $WT_2$, ... $WT_N$; wherein N being an integer, wherein each wind turbine $WT_X$ is being controlled by an associated control system $CS_X$ in accordance with an array of predetermined control criteria by transmitting control instructions $CI_X$ from said control system $CS_X$ to said wind turbine $WT_X$, including control instructions $CI_X$ instructing said wind turbine $WT_X$ to shut down or to operate under reduced power production.
Each wind turbine is being coupled to a master controller MC, wherein said master controller MC is being configured to be able to transmit to the control system $CS_X$ associated with one or more of said wind turbines $WT_X$, a master instruction $MI_X$, overruling control instructions being transmitted from said control system $CS_X$ to said wind turbine $WT_X$ with the view to shut down said wind turbine $WT_X$ or with the view to force said wind turbine $WT_X$ to operate under reduced power production. The monitoring system MS, in respect of each wind turbine $WT_X$, is being configured to receive and log from the corresponding control system $CS_X$ information relating to timestamp and information associated with the specific condition or reason for making said wind turbine $WT_X$ shut down or operate under reduced power production; as well as duration of such forced power reduced operation wherein said monitoring system MS is being configured to generate an operational report OR, wherein said operational report OR sets out details as to time stamps, duration and reason or condition causing such shut downs or operation under reduced power production.

19 Claims, 1 Drawing Sheet

(51) Int. Cl.
*F03D 17/00* (2016.01)
*H02J 3/38* (2006.01)

(58) Field of Classification Search
USPC .......................................................... 700/286
See application file for complete search history.

(56) References Cited

U.S. PATENT DOCUMENTS

2020/0201950 A1* 6/2020 Wang ..................... G06N 20/00
2020/0378362 A1* 12/2020 Kullander ................. F03D 7/02

* cited by examiner

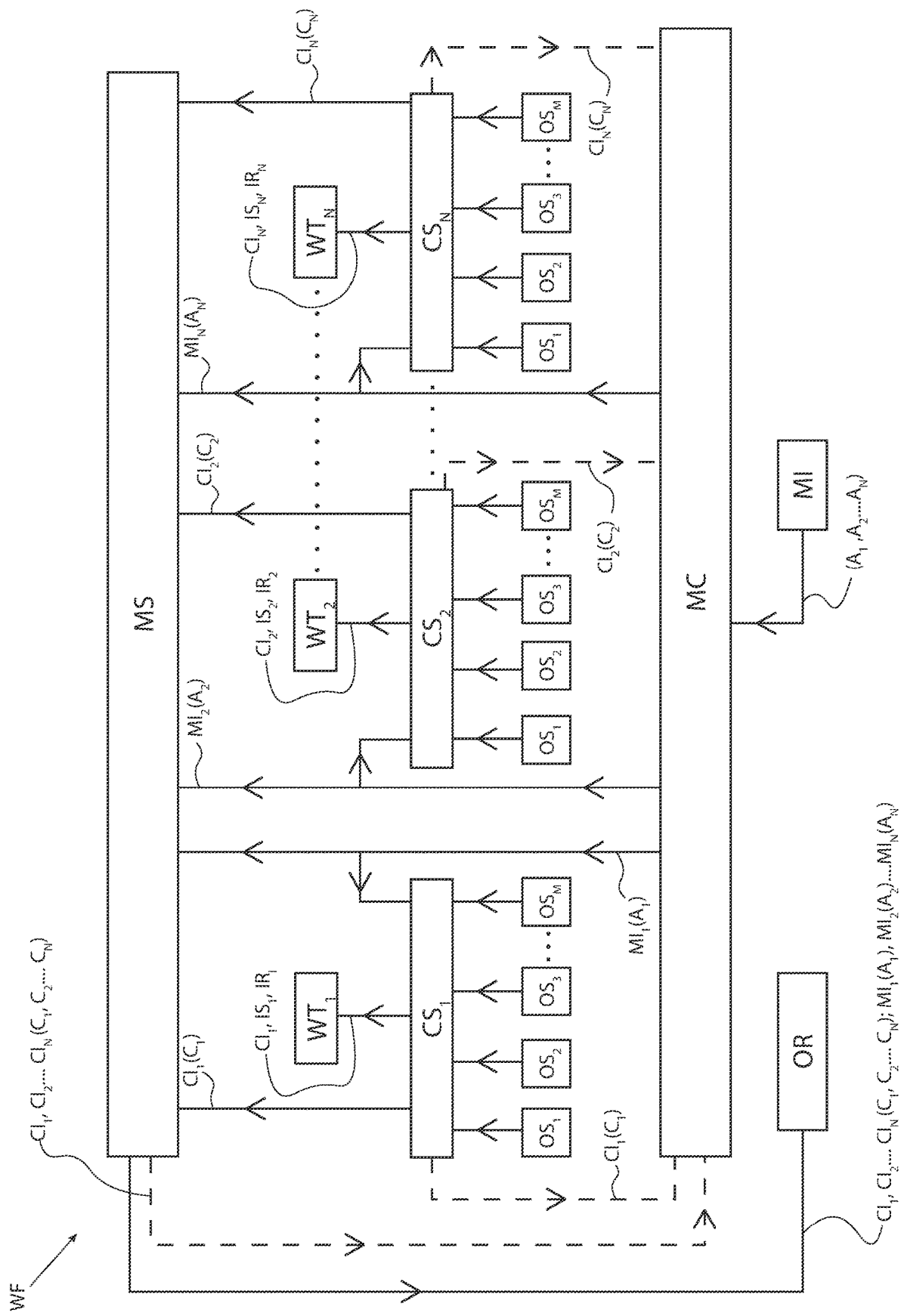

MONITORING SYSTEM FOR WIND TURBINES

CROSS-REFERENCE TO RELATED APPLICATIONS

This application is claims priority from Danish patent application PA 2021 00225, filed Mar. 5, 2021, the contents of which are incorporated herein by reference in their entirety.

FIELD OF THE INVENTION

The present invention generally relates to the field of operation of wind turbines. More specifically, the present invention relates in a first aspect to a monitoring system for monitoring the operation of a number of wind turbines.

In a second aspect the present invention relates to the use of the monitoring system according to the first aspect for monitoring the operation of one or more wind turbines.

In a third aspect the present invention relates to a method for monitoring the operation of a number of wind turbines.

In a fourth aspect the present invention relates to a computer program product, which when being loaded on a computer is being configured to carry out the method according to the third aspect of the invention.

In a fifth aspect, the present invention relates to a wind farm comprising a monitoring system as defined in respect of the first aspect.

BACKGROUND OF THE INVENTION

Within the latest decades harvesting of wind energy by means of wind turbines has undergone a tremendous evolution. Usually, wind turbines are being operated in wind farms comprising a relatively large number of wind turbines being arranged within a relatively small area.

Each wind turbine in a wind farm is being controlled by its own individual control system. The control system is coupled to a plurality of sensors providing information as to various parameters relating to the operation of the wind turbine. Typically, hundreds of different sensors are employed. The control system is having embedded therein an algorithm setting out how the wind turbine is to be controlled on the basis of input from the sensors.

Included in the control system are also various safety measures which will instruct the wind turbine to shut down or to be operated under forced reduction of power production in case the sensors suggest that the wind turbine is encountering critical conditions which may lead to hazards to the structural integrity of the wind turbine itself or to hazards to persons being located in the vicinity of the wind turbine. Such critical conditions may e.g. relate to too high wind speeds, ice formation on the wind turbine blades leading to imbalance of the rotor, too low gear oil level, to high gear oil temperature, amongst other conditions.

Accordingly, such safety measures of the control system of a wind turbine will in many instances prevent situations which are considered as being unhealthy for the wind turbine itself or even hazardous for person being present in the vicinity of the wind turbine.

Along with the control system, a wind turbine typically also comprises a monitoring system which will monitor and log the operation of the wind turbine, including logging of the parameter values sensed by at least some of the sensors as a function of time.

Hereby it will be possible to determine which conditions is causing the safety measures of the control system of the wind turbine to make the wind turbine shut down or operate under forced reduced power production.

Such information is valuable for the manufacturer of the wind turbine in relation to the ever present quest of improving the operation and efficiency of a wind turbine. In other words, when the manufacturer of a wind turbine is gaining information as to which conditions is hazardous for the structural integrity of a wind turbine, the manufacturer will also know which parts of the wind turbine could be subject to improvements. Accordingly, the safety measures embedded in the control system of a wind turbine seeks to avoid damages to the wind turbine when the wind turbine encounters stressful conditions.

In addition, information relating to which conditions are causing a wind turbine to shut down or to operate at a forced reduction of power is also valuable in relation to allocating power production profits between the owner of the wind turbine and the operator of the wind turbine according to a predetermined contract.

Whereas the safety measures mentioned above and relating to protection of the structural integrity of the wind turbine itself and avoiding hazards to persons being present in the vicinity of the wind turbine are typically designed by the manufacturer of the wind turbine or at least adapted to a specific type of wind turbine of a manufacturer, an operator of a wind farm usually provides a master controller which allows overruling any instructions provided by a control system of a specific wind turbine and relating to the operation of that wind turbine.

Hereby is achieved that an operator of a wind farm will be able to take into account, conditions which are not intrinsic to the individual wind turbines themselves of the wind farm, but which relate to specific local conditions which need to be taking into consideration in order to secure a safe operation of the wind turbines of the wind farm.

Such specific local condition which it is desired to take into account during operation of the wind farm could inter alia be a situation in which a wind farm is located at a location which is part of a preferred route of migration birds, or the wind farm could be located at a location in vicinity of a bat habitat. In such situations the operator of the wind farm typically sets up radar equipment which will be able to detect migrating birds or flying bats in the vicinity of individual wind turbines of the wind farm and on the basis of information provided by such radar equipment, the master controller may be programmed to overrule any instructions provided by the control system of each wind turbine of the wind farm and shut down the individual wind turbines in order to avoid animals colliding with the rotating wind turbine blades.

Other situations where it is desirably to overrule, by means of master controller, the instructions provided by a control system of a wind turbine in the operation of such a wind turbine could be in case of regularly performed inspections or maintenance of an individual wind turbine, or in case that problems in respect of a specific wind turbine is being "manually" detected by an operator, but not by the sensors of the control system.

In such situations it will be desirably to be able to either shut down one or more wind turbines of the wind farm, or to force an individual wind turbine to operate under reduced power production.

The problems with such master controllers are that that as the control system of the individual wind turbine will not be able to detect and log which specific condition implied that specific wind turbine to shut down or operate under forced reduced power production.

Accordingly, upon activation of the master controller leading to one or more wind turbines of a wind farm being shut down or being forced to operate under forced reduction of power, information relating to the cause of lock down or forced altered operation is not properly detected and logged by the monitoring system of the individual wind turbine.

Hence, in the operational report being generated by the monitoring system of the control system of a specific wind turbine, an incomplete history relating to the operation and to causes for shut downs or forced altered operation of the wind turbine will result when master controller forces that wind turbine to shut down or to operate under forced reduction of power.

This on the other hand is detrimental for the wind turbine manufacturer in its attempts to ever improve the design of wind turbines with the view to increase the efficiency of wind turbines.

Moreover, such incomplete operational history makes it difficult to precisely allocate power production profits between the owner of the wind turbine and the operator of the wind turbine according to the predetermined contract.

Accordingly, a need exists for an improved monitoring system for wind turbines exists which will overcome the above-mentioned problems.

It is an objective of the present invention to provide technology which will overcome the above-mentioned problems.

BRIEF DESCRIPTION OF THE INVENTION

This objective is fulfilled with the present in its various aspects.

Accordingly, the present invention in its first aspect relates to a monitoring system MS for monitoring the operation of a number N of wind turbines $WT_1$, $WT_2$, . . . $WT_N$; wherein N being an integer:

wherein each wind turbine $WT_X$ is being controlled by an associated control system $CS_X$ in accordance with an array of predetermined control criteria by transmitting control instructions $CI_X$ from said control system $CS_X$ to said wind turbine $WT_X$;

wherein in respect of said wind turbine $WT_X$, one or more of said control instructions $CI_X$ is/are an instruction $IS_X$, instructing said wind turbine $WT_X$ to shut down, and/or wherein one or more of said one or more of said control instructions $CI_X$ is/are an instruction $IR_X$, instructing said wind turbine $WT_X$ to operate under reduced power production;

wherein each said wind turbine is being coupled to a master controller MC, wherein said master controller MC is being configured to be able to transmit to the control system $CS_X$ associated with one or more of said wind turbines $WT_X$, a master instruction $MI_X$, overruling control instructions $CI_X$ being transmitted from said control system $CS_X$ to said wind turbine $WT_X$ with the view to shut down said wind turbine $WT_X$ or with the view to force said wind turbine $WT_X$ to operate under reduced power production;

wherein said monitoring system MS, in respect of each wind turbine $WT_X$, is being configured to receive and log from the corresponding control system $CS_X$ the following information:

timestamp and information associated with the specific condition causing instructions $IS_X$, to be transmitted from said control system $CS_X$ to said wind turbine $WT_X$ in order to shut down said wind turbine $WT_X$; as well as duration of such shut down;

timestamp and information associated with the specific condition causing instructions $IR_X$, being transmitted from said control system $CS_X$ to said wind turbine $WT_X$ in order to force said wind turbine to operate under reduced power production; as well as duration of such forced power reduced operation;

wherein said monitoring system MS, in respect of each wind turbine $WT_X$, is being configured to receive and log from said master controller MC, the following information:

timestamp of and information relating to reason for providing master instructions $MI_X$, being transmitted from said master controller MC to said control system $CS_X$ with the view to shut down said wind turbine $WT_X$, as well as duration of such shut down;

timestamp of and information relating to reason for providing master instructions $MI_X$, being transmitted from said master controller to said control system $CS_X$ with the view to force said wind turbine $WT_X$, to operate under reduced power production, as well as duration of such forced power reduced operation;

wherein said monitoring system MS is being configured to generate an operational report OR:

wherein said operational report OR sets out, in respect of each wind turbine $WT_X$, time stamps of and information associated with specific conditions causing instructions $IS_X$, shutting down said wind turbine $WT_X$, and/or instructions $IR_X$ forcing said wind turbine $WT_X$ to operate under reduced power production, as well as duration of such shut down and/or of such forced operation under reduced power:

wherein said operational report sets out, in respect of each wind turbine $WT_X$, timestamp of and information relating to reasons for providing master instructions $MI_X$, forcing said wind turbine $WT_X$ to shut down, or to operate under reduced power production as well as duration of such shut down and/or of such forced operation under reduced power.

In a second aspect, the present invention provides the use of a monitoring system according to the first aspect of the present invention for monitoring the operation of one or more of said wind turbines $WT_X$.

In a third aspect the present invention relates to a method for monitoring the operation of a number N of wind turbines $WT_1$, $WT_2$ . . . . $WT_N$, wherein N being an integer; wherein said method comprises:

i) providing a number N of wind turbines $WT_1$, $WT_2$, . . . $WT_N$, N being an integer, wherein each wind turbine $WT_X$ is being controllable by an associated control system $CS_X$ in accordance with an array of predetermined control criteria by transmitting control instructions $CI_X$ from said control system $CS_X$ to said wind turbine $WT_X$; wherein in respect of said wind turbine $WT_X$, one or more of said control instructions $CI_X$ is/are an instruction $IS_X$, instructing said wind turbine $WT_X$ to shut down, and/or wherein one or more of said one or more of said control instructions $CI_X$ is/are an instruction $IR_X$, instructing said wind turbine $WT_X$ to operate under reduced power production:

ii) providing a master controller MC, wherein in respect of each said wind turbines $WT_X$, said control system $CS_X$ of said wind turbine $WT_X$ is being coupled to said master controller MC, wherein said master controller MC is being configured to be able to transmit to one or more of said control systems $CS_X$ of said wind turbines $WT_X$, a master instruction $MI_X$, overruling control instructions $CI_X$. $IS_X$. $IR_X$ being transmitted from said control system $CS_X$ to said wind turbine $WT_X$ with the view to shut down said wind turbine $WT_X$ or with the view to force said wind turbine $WT_X$ to operate under reduced power production:

iii) providing a monitoring system MS, wherein said monitoring system MS, in respect of each wind turbine $WT_X$, is being configured to receive and log from the corresponding control system $CS_X$ the following information:

timestamp and information associated with the specific condition causing instructions $IS_X$, to be transmitted from said control system $CS_X$ to said wind turbine $WT_X$ in order to shut down said wind turbine $WT_X$; as well as duration of such shut down;

timestamp and information associated with the specific condition causing instructions $IR_X$, being transmitted from said control system $CS_X$ to said wind turbine $WT_X$ in order to force said wind turbine to operate under reduced power production; as well as duration of such forced power reduced operation; and wherein said monitoring system MS, in respect of each wind turbine $WT_X$, is being configured to receive and log from the master controller MC, the following information:

timestamp of and information relating to reason for providing master instructions $MI_X$, being transmitted from said master controller MC to said control system $CS_X$ in order to shut down said wind turbine $WT_X$, as well as duration of such shut down:

timestamp of and information relating to reason for providing master instructions $MI_X$, being transmitted from said master controller MC to said control system $CS_X$ in order to force said wind turbine $WT_X$, to operate under reduced power production, as well as duration of such forced power reduced operation;

iv) operating each said wind turbines $WT_X$, by controlling said wind turbine by said corresponding control system $CS_X$; and by allowing, whenever considered necessary, said master controller MC to transmit to one or more of the control system $CS_X$ associated with said wind turbine $WT_X$, a master instruction $MI_X$, overruling control instructions $CI_X$ being transmitted from said control system $CS_X$ to said wind turbine $WT_X$ with the view to shut down said wind turbine $WT_X$ or with the view to force said wind turbine $WT_X$ to operate under reduced power production;

v) making said monitoring system MS generate an operational report OR;

wherein said operational report OR sets out, in respect of each wind turbine $WT_X$, time stamps of and information associated with the specific condition causing instructions $IS_X$, shutting down said wind turbine $WT_X$, and/or instructions $IR_X$ forcing said wind turbine $WT_X$ to operate under reduced power production, as well as duration of such shut down and/or of such forced operation under reduced power;

and wherein said operational report sets out, in respect of each wind turbine $WT_X$, timestamp of and information relating to reason for providing master instructions $MI_X$, forcing said wind turbine $WT_X$, to shut down, or to operate under reduced power production as well as duration of such shut down and/or of such forced operation under reduced power.

In a fourth aspect the present invention relates to a computer program product, which when being loaded on a computer is being configured to carry out the method according to the third aspect of the present invention.

In a fifth aspect the present invention relates to a wind farm WF comprising:

a number N of wind turbines $WT_1$, $WT_2$, . . . $WT_N$, wherein N being an integer;

a monitoring system MS;

a master controller MC:

wherein each said wind turbine $WT_X$ is being controlled by an associated control system $CS_X$, wherein said control system $CS_X$ is being configured to operate said wind turbine $WT_X$ in accordance with an array of predetermined control criteria by transmitting control instructions $CI_X$ from said control system $CS_X$ to said wind turbine $WT_X$; wherein in respect of said wind turbine $WT_X$, one or more of said control instructions $CI_X$ is/are an instruction $IS_X$, instructing said wind turbine $WT_X$ to shut down, and/or wherein one or more of said one or more of said control instructions $CI_X$ is/are an instruction $IR_X$, instructing said wind turbine $WT_X$ to operate under reduced power production;

wherein the control system $CS_X$ of each said wind turbine $WT_X$ is being coupled to said master controller MC, wherein said master controller MC is being configured to be able to transmit to one or more of said control systems $CS_X$ of said wind turbines $WT_X$, a master instruction $MI_X$, overruling control instructions $CI_X$, $IS_X$, $IR_X$ being transmitted from said control system $CS_X$ to said wind turbine $WT_X$ with the view to shut down said wind turbine $WT_X$ or with the view to force said wind turbine $WT_X$ to operate under reduced power production:

wherein said monitoring system MS is being configured as set out according to the first aspect of the present invention.

The present invention in its various aspects allows an operator, an owner or a manufacturer of wind turbines of a wind farm to gain a complete and compiled set of information setting out the time periods in which one or more of the wind turbines of the wind farm has been forced to shut down or to operate under forced power production, and also the reasons for doing so.

Such information will accordingly be useful for the manufactures and designers of wind turbine and wind parks in future wind farm project to optimize specific features and parameters of each wind turbine and components thereof as well as specific features and parameters relating to the wind farm itself with the view to optimize wind power production.

Moreover, with the monitoring system according to the present invention and specifically its generated operational report OR which provides a full picture as to which reasons or conditions have caused any shut down or any forced operation under reduced power production, will allow a more correct allocation or sharing of profits resulting from power production of a wind farm between the owner of the wind farm and the operator of the wind farm, according to a predetermined contract.

BRIEF DESCRIPTION OF THE FIGURE

FIG. 1 is a schematic diagram illustrating the working mode of the present invention.

DETAILED DESCRIPTION OF THE INVENTION

The First Aspect of the Present Invention

The present invention in its first aspect relates to a monitoring system MS for monitoring the operation of a number N of wind turbines $WT_1$, $WT_2$, . . . $WT_N$; wherein N being an integer;

wherein each wind turbine $WT_X$ is being controlled by an associated control system $CS_X$ in accordance with an array of predetermined control criteria by transmitting control instructions $CI_X$ from said control system $CS_X$ to said wind turbine $WT_X$;

wherein in respect of said wind turbine $WT_X$, one or more of said control instructions $CI_X$ is/are an instruction $IS_X$, instructing said wind turbine $WT_X$ to shut down, and/or wherein one or more of said one or more of said control instructions $CI_X$ is/are an instruction $IR_X$, instructing said wind turbine $WT_X$ to operate under reduced power production;

wherein each said wind turbine is being coupled to a master controller MC, wherein said master controller MC is being configured to be able to transmit to the control system $CS_X$ associated with one or more of said wind turbines $WT_X$, a master instruction $MI_X$, overruling control instructions $CI_X$ being transmitted from said control system $CS_X$ to said wind turbine $WT_X$ with the view to shut down said wind turbine $WT_X$ or with the view to force said wind turbine $WT_X$ to operate under reduced power production:

wherein said monitoring system MS, in respect of each wind turbine $WT_X$, is being configured to receive and log from the corresponding control system $CS_X$ the following information:
- timestamp and information associated with the specific condition causing instructions $IS_X$, to be transmitted from said control system $CS_X$ to said wind turbine $WT_X$ in order to shut down said wind turbine $WT_X$; as well as duration of such shut down;
- timestamp and information associated with the specific condition causing instructions $IR_X$, being transmitted from said control system $CS_X$ to said wind turbine $WT_X$ in order to force said wind turbine to operate under reduced power production; as well as duration of such forced power reduced operation;

wherein said monitoring system MS, in respect of each wind turbine $WT_X$, is being configured to receive and log from said master controller MC, the following information:
- timestamp of and information relating to reason for providing master instructions $MI_X$ being transmitted from said master controller MC to said control system $CS_X$ with the view to shut down said wind turbine $WT_X$, as well as duration of such shut down:
- timestamp of and information relating to reason for providing master instructions $MI_X$, being transmitted from said master controller to said control system $CS_X$ with the view to force said wind turbine $WT_X$, to operate under reduced power production, as well as duration of such forced power reduced operation:

wherein said monitoring system MS is being configured to generate an operational report OR;

wherein said operational report OR sets out, in respect of each wind turbine $WT_X$, time stamps of and information associated with specific conditions causing instructions $IS_X$, shutting down said wind turbine $WT_X$, and/or instructions $IR_X$ forcing said wind turbine $WT_X$ to operate under reduced power production, as well as duration of such shut down and/or of such forced operation under reduced power;

wherein said operational report OR sets out, in respect of each wind turbine $WT_X$, timestamp of and information relating to reasons for providing master instructions $MI_X$, forcing said wind turbine $WT_X$ to shut down, or to operate under reduced power production as well as duration of such shut down and/or of such forced operation under reduced power.

The monitoring system of the first aspect of the present invention accordingly in respect of each wind turbine of the wind farm provides for logging and storing information relating time stamps and duration of instructions forcing that wind turbine to shut down or operate under forced reduced power production, irrespective whether these instructions are being transmitted from the control system associated with the wind turbine, or is being transmitted from the master controller.

Hereby an operational report may be generated which constitutes a compilation of information relating to such forced shut downs and forced operation under reduced power production, includes the corresponding time stamps and duration of such forced shut downs and forced operation under reduced power production.

In one embodiment of the monitoring system according to the first aspect of the present invention, the number N of wind turbines, is an integer selected from the ranges 1-1,000 or more, such as 2-900, for example 5-800, such as 10-700, for example 20-600, e.g. 30-500, such as 40-450, e.g. 50-400, such as 60-350, for example 70-300, such as 80-250, such as 90-200, for example 100-150.

Hereby the monitoring system is capable of monitoring a relatively large number of wind turbines.

In one embodiment of the monitoring system according to the first aspect of the present invention, and in respect of one or more of said wind turbines $WT_X$, said wind turbine $WT_X$ comprises a number M of operational sensors $OS_1$, $OS_2$, $OS_3$, ... $OS_M$, wherein each specific operational sensor $OS_X$ is configured to provide information to said control system $CS_X$ relating to one or more parameters of operation of said wind turbine $WT_X$ and wherein said control system $CS_X$; is being configured to provide said instruction $IS_X$, which instructs said wind turbine $WT_X$ to shut down, and/or said instruction $IR_X$, which instructs said wind turbine $WT_X$ to operate under reduced power production, on the basis of input from one or more of said operational sensors $OS_1$, $OS_2$, $OS_3$ ... $OS_M$, and according to predetermined operational criteria.

In one embodiment of the monitoring system according to the first aspect of the present invention the and in respect of a specific wind turbine $WT_X$, the number M of operational sensors $OS_1$, $OS_2$, $OS_3$, ... $OS_M$, independently is selected from the ranges 1-1,000 or more, such as 5-900, for example 10-800, such as 20-700, e.g. 30-600, for example 50-500, such as 100-400 or 200-300.

Hereby the instruction $IS_X$, which instructs said wind turbine $WT_X$ to shut down, and/or said instruction $IR_X$, which instructs said wind turbine $WT_X$ to operate under reduced power production may be generated on the basis of a huge number of parameter and/or parameter values, thereby ensuring a detailed scheme of when to provide such instructions $IS_X$ and $IR_X$.

In one embodiment of the monitoring system according to the first aspect of the present invention the operational sensors $OS_1$, $OS_2$, $OS_3$, ... $OS_M$, is/are selected from a group of sensors for sensing one or more of the following parameters: maintenance parameters, such as time passed since latest component and/or system level self-test, twisting of wires; internal parameters, such as component temperature of one or more components, oil levels in oil sump; pressure of hydraulic oil; ambient parameters, such as ambient wind speed, ambient wind temperature, presence of ice on wind turbine blade(s); severe weather conditions, such as wave height, snow, ice, lightning, tornados, hail; grid parameters, such as grid voltage, grid frequency, presence of phase imbalance.

Such parameters will provide for transmitting instructions to make the wind turbine shut down, and/or to operate under reduced power production due to concerns most commonly encountered during operating the wind turbine.

In one embodiment of the monitoring system according to the first aspect of the present invention said N wind turbines form part of a wind farm located within a predetermined area, wherein said master controller MC is being coupled to one or more, preferably all of said control systems $CS_X$ associated with said wind turbines $WT_X$ of said wind farm.

Hereby a central monitoring system, monitoring each wind turbine of a wind farm is provided.

In one embodiment of the monitoring system according to the first aspect of the present invention and in respect of each wind turbine $WT_X$, said information associated with specific conditions causing instructions $IS_X$ and/or instructions $IR_X$, to be transmitted to said monitoring system MS from said control system $CS_X$ relates to information specifying which type of parameter(s) and/or parameter values has/have caused said control system to transmit to said wind turbine $WT_X$, said instruction $IS_X$ and/or said instruction $IR_X$.

Hereby the monitoring system will be able to monitor which type of parameter(s) and/or parameter values has/have caused the control system to transmit to said wind turbine $WT_X$, said instruction $IS_X$ and/or said instruction $IR_X$ in order to shut down said wind turbine or in order to force said wind turbine to operate under reduced power production.

In one embodiment of the monitoring system according to the first aspect of the present invention and in respect of each wind turbine $WT_X$, said information associated with specific conditions causing instructions $IS_X$ and/or instructions $IR_X$, to be transmitted to said monitoring system MS from said control system $CS_X$ is in the form of one or more codes $C_X$, such as error codes or alarm codes, identifying such condition(s).

In one embodiment of the monitoring system according to the first aspect of the present invention and in respect of each wind turbine $WT_X$, said monitoring system MS is being configured to generate said operational report OR, wherein said operational report OR includes such code(s) $C_X$, identifying the specific conditions causing instructions $IS_X$ and/or instructions $IR_X$, to be transmitted to said monitoring system MS from said control system $CS_X$.

Such codes make it easy to identify, at a later stage, which condition(s) has/have caused a wind turbine to shut down or to force said wind turbine to operate under reduced power production.

In one embodiment of the monitoring system according to the first aspect of the present invention said master controller MC is configured to receive a master inputs MI from a human operator or from an operating system, wherein said master input MI relates to operational instructions for operating said master controller MC.

This feature makes it possible for the master controller to be operated on the basis of human and manual inputs or on the basis of input from an operative system, such as an automatic operative system, which in turn may be provided with inputs from auxiliary monitoring devices, such as radars for monitoring presence of birds or bats in the vicinity of one or more of the N wind turbines.

In one embodiment of the monitoring system according to the first aspect of the present invention and in respect of each said wind turbine $WT_X$, said master controller MC is configured to, along with the receival of a master instruction MI, to receive an annotation $A_X$ associated with the reason for making the master controller MC provide a master instruction $MI_X$, to said control system $CS_X$ with the view to shut down said wind turbine $WT_X$, or with the view to force said wind turbine $WT_X$, to operate under reduced power production.

Hereby, whenever one of the N wind turbines is instructed by that master controller to shut down or to operate under reduced power production, the reason for providing such instruction can be annotated to that instruction, thereby allowing, at a later stage to identify the reason or concern which has implied such shut down or such forced operation under reduced power production.

In one embodiment of the monitoring system according to the first aspect of the present invention and in respect of each wind turbine $WT_X$, said annotation $A_X$, associated with a master instruction $MI_X$ being transmitted from said master controller MC to one or more control systems $CS_X$ associated with said wind turbine $WT_X$, is being selected from the following group of annotations:

an annotation relating to a first type of master instructions provided in accordance with one or more predetermined safety criteria;

an annotation relating to a second type of master instructions provided in accordance with one or more safety criteria caused by an acutely encountered risk situation;

an annotation relating to a third type of master instructions provided in accordance with one or more manually defined criteria.

Such types of reasons are typically encountered during the operation of a wind farm.

In one embodiment of the monitoring system according to the first aspect of the present invention, said master instruction $MI_X$ being transmitted from said master controller MC to the control system $CS_X$ associated said wind turbine $WT_X$, in order to shut down said wind turbine $WT_X$, or in order to force said wind turbine $WT_X$ to operate under reduced power production, and optionally also the annotation $A_X$ associated with said master instruction $MI_X$, relates to one of the following concerns or reasons:

A—Trading: i) low or negative prices of electric power; ii) keeping reserve capabilities in order to be able to quickly add these to the grid;

B—Grid parameters: i) overloaded grid: ii) overheated overhead power wires, iii) improper grid voltage, iv) improper grid frequency, v) presence of phase imbalance;

C—Avian: i) risk of striking birds; ii) risk of striking bats;

D—Noise: desire to reduce noise levels of wind turbine;

E—Shadow: desire to avoid light flickering on neighboring residences;

F—Sector management: desire to reduce wake effect of wind turbines in close proximity;

G—Icing: desire to reduce hazards due to deposited ice on wind turbine blades blades being thrown around;

H—Maintenance—i) desire to unwind cables; ii) desire to shut down a wind turbine due to physical inspection;

I—Severe weather conditions, such as i) wave height, ii) snow, iii) ice, iv) lightning, v) tornados, vi) hail.

Such types of reasons are typically encountered during the operation of a wind farm.

In one embodiment of the monitoring system according to the first aspect of the present invention, and in respect of each said wind turbines $WT_X$, said monitoring system MS is being configured to receive said annotation $A_X$ along with said master instruction $MI_X$, thereby transmitting to said monitoring system MS, the reason for shutting down said wind turbine $WT_X$, or the reason to operate said wind turbine $WT_X$ under reduced power production, as expressed by said annotation $A_X$.

Hereby, the monitoring system will be informed the reason or concern which has implied the shut down or the forced operation under reduced power production of the wind turbines.

In one embodiment of the monitoring system according to the first aspect of the present invention said monitoring system MS is being configured to generate said operational report OR, wherein said operational report OR includes such annotation $A_X$, identifying the specific reason(s) for transmitting said master instruction $MI_X$ from said master controller MC to said control system $CS_X$, with the view to shut down said wind turbine $WT_X$, or with the view to force said wind turbine $WT_X$ to operate under reduced power production.

Hereby it is possible, at a later stage to identify the reason or concern which has implied the shut down or the forced operation under reduced power production of the wind turbines.

In one embodiment of the monitoring system according to the first aspect of the present invention said monitoring system MS is being configured to transmit to said master controller MC, control information relating to the operation of one or more, preferably all said wind turbines $WT_X$.

Hereby the master controller is gaining information relating to the control information being transmitted from a specific control system to the corresponding wind turbine.

In one embodiment of the monitoring system according to the first aspect of the present invention one or more of said control systems $CS_X$, preferably all said control systems $CS_X$ is/are being configured to transmit to said master controller MC, control information relating to the operation of the associated wind turbine $WT_X$.

Hereby the master controller is gaining information relating to the control information being transmitted from a specific control system to the corresponding wind turbine.

The Second Aspect of the Present Invention

In a second aspect, the present invention provides the use of a monitoring system according to the first aspect of the present invention for monitoring the operation of one or more of said wind turbines $WT_X$.

The Third Aspect of the Present Invention

In a third aspect the present invention relates to a method for monitoring the operation of a number N of wind turbines $WT_1$, $WT_2$, . . . $WT_N$; N being an integer; wherein said method comprises:

i) providing a number N of wind turbines $WT_1$, $WT_2$, . . . $WT_N$, N being an integer, wherein each wind turbine $WT_X$ is being controllable by an associated control system $CS_X$ in accordance with an array of predetermined control criteria by transmitting control instructions $CI_X$ from said control system $CS_X$ to said wind turbine $WT_X$; wherein in respect of said wind turbine $WT_X$, one or more of said control instructions $CI_X$ is/are an instruction $IS_X$, instructing said wind turbine $WT_X$ to shut down, and/or wherein one or more of said one or more of said control instructions $CI_X$ is/are an instruction $IR_X$, instructing said wind turbine $WT_X$ to operate under reduced power production;

ii) providing a master controller MC, wherein in respect of each said wind turbines $WT_X$, said control system $CS_X$ of said wind turbine $WT_X$ is being coupled to said master controller MC, wherein said master controller MC is being configured to be able to transmit to one or more of said control systems $CS_X$ of said wind turbines $WT_X$, a master instruction $MI_X$, overruling control instructions $CI_X$, $IS_X$, $IR_X$ being transmitted from said control system $CS_X$ to said wind turbine $WT_X$ with the view to shut down said wind turbine $WT_X$ or with the view to force said wind turbine $WT_X$ to operate under reduced power production;

iii) providing a monitoring system MS, wherein said monitoring system MS, in respect of each wind turbine $WT_X$, is being configured to receive and log from the corresponding control system $CS_X$ the following information:

timestamp and information associated with the specific condition causing instructions $IS_X$, to be transmitted from said control system $CS_X$ to said wind turbine $WT_X$ in order to shut down said wind turbine $WT_X$; as well as duration of such shut down;

timestamp and information associated with the specific condition causing instructions $IR_X$, being transmitted from said control system $CS_X$ to said wind turbine $WT_X$ in order to force said wind turbine to operate under reduced power production; as well as duration of such forced power reduced operation, and wherein said monitoring system MS, in respect of each wind turbine $WT_X$, is being configured to receive and log from the master controller MC, the following information:

timestamp of and information relating to reason for providing master instructions $MI_X$, being transmitted from said master controller MC to said control system $CS_X$ in order to shut down said wind turbine $WT_X$, as well as duration of such shut down;

timestamp of and information relating to reason for providing master instructions $MI_X$, being transmitted from said master controller MC to said control system $CS_X$ in order to force said wind turbine $WT_X$, to operate under reduced power production, as well as duration of such forced power reduced operation;

iv) operating each said wind turbines $WT_X$, by controlling said wind turbine by said corresponding control system $CS_X$; and by allowing, whenever considered necessary, said master controller MC to transmit to one or more of the control system $CS_X$ associated with said wind turbine $WT_X$, a master instruction $MI_X$, overruling control instructions $CI_X$ being transmitted from said control system $CS_X$ to said wind turbine $WT_X$ with the view to shut down said wind turbine $WT_X$ or with the view to force said wind turbine $WT_X$ to operate under reduced power production;

v) making said monitoring system MS generate an operational report OR;

wherein said operational report OR sets out, in respect of each wind turbine $WT_X$, time stamps of and information associated with the specific condition causing instructions $IS_X$, shutting down said wind turbine $WT_X$, and/or instructions $IR_X$ forcing said wind turbine $WT_X$ to operate under reduced power production, as well as duration of such shut down and/or of such forced operation under reduced power;

and wherein said operational report OR sets out, in respect of each wind turbine $WT_X$, timestamp of and information relating to reason for providing master instructions $MI_X$, forcing said wind turbine $WT_X$, to shut down, or to operate under reduced power production as well as duration of such shut down and/or of such forced operation under reduced power.

The Fourth Aspect of the Present Invention

In a fourth aspect the present invention relates to a computer program product, which when being loaded on a computer is being configured to carry out the method according to the third aspect of the present invention.

The Fifth Aspect of the Present Invention

In a fifth aspect the present invention relates to a wind farm WF comprising:

a number N of wind turbines $WT_1$, $WT_2$, . . . $WT_N$, wherein N being an integer;

a monitoring system MS;

a master controller MC;

wherein each said wind turbine $WT_X$ is being controlled by an associated control system $CS_X$, wherein said control system $CS_X$ is being configured to operate said wind turbine $WT_X$ in accordance with an array of predetermined control criteria by transmitting control instructions $CI_X$ from said control system $CS_X$ to said wind turbine $WT_X$; wherein in respect of said wind turbine $WT_X$, one or more of said control instructions $CI_X$ is/are an instruction $IS_X$, instructing said wind turbine $WT_X$ to shut down, and/or wherein one or more of said one or more of said control instructions $CI_X$ is/are an instruction $IR_X$, instructing said wind turbine $WT_X$ to operate under reduced power production;

wherein the control system $CS_X$ of each said wind turbine $WT_X$ is being coupled to said master controller MC, wherein said master controller MC is being configured to be able to transmit to one or more of said control systems $CS_X$ of said wind turbines $WT_X$, a master instruction $MI_X$, overruling control instructions $CI_X$, $IS_X$, $IR_X$ being transmitted from said control system $CS_X$ to said wind turbine $WT_X$ with the view to shut down said wind turbine $WT_X$ or with the view to force said wind turbine $WT_X$ to operate under reduced power production:

wherein said monitoring system MS is being configured as set out according to the first aspect of the present invention.

Referring now to the figures for better illustrating the present invention FIG. 1 is a schematic diagram illustrating the working mode of the present invention.

FIG. 1 shows the wind farm WF comprising N identical wind turbines $WT_1$, $WT_2$, ... $WT_N$.

Each specific wind turbine $WT_X$ is being controlled by an associated control system $CS_X$ in accordance with an array of predetermined control criteria by transmitting control instructions $CI_X$ from said control system $CS_X$ in to said wind turbine $WT_X$.

Each control system $CS_X$ is associated with a specific wind turbine $WT_X$ is gaining information as to internal and external parameters from an array of operational sensors $OS_1$, $OS_2$, $OS_3$, ... $OS_M$, each sensing a single or a combination of parameters. These parameters may be internal parameters relating to the wind turbine itself or its components, or they may relate to parameters external to the wind turbine or its parameters, such as relating to the parameters of the weather.

Some of the control instructions $CI_X$ being transmitted from the control system $CS_X$ to the wind turbine $WT_X$ is/are an instruction $IS_X$, instructing said wind turbine $WT_X$ to shut down. Other of these control instructions $CI_X$ is/are an instruction $IR_X$, instructing said wind turbine $WT_X$ to operate under reduced power production.

Accordingly, each control system $CS_X$ associated with a specific wind turbine $WT_X$ is having embedded therein an algorithm relating to how to control the wind turbine $WT_X$ on the basis of parameter values being sensed by the operational sensors $OS_1$, $OS_2$, $OS_3$, ... $OS_M$.

In respect of each wind turbine $WT_X$, its associated control system $CS_X$ transmits to a monitoring system MS control information $CI_X$ relating to parameter values relating to the operation of the wind turbine $WT_X$, including the instructions $IS_X$, instructing said wind turbine $WT_X$ to shut down and relating to the control instructions $CI_X$, instructing said wind turbine $WT_X$ to operate under reduced power production.

Hereby can be monitored by the monitoring system MS how each wind turbine $WT_X$ is being operated by its associated control system $CS_X$. Accordingly, the monitoring system MS, in respect of each wind turbine $WT_X$, is being configured to receive and log from the corresponding control system $CS_X$ the following information:

timestamp and information associated with the specific condition causing instructions $IS_X$, to be transmitted from said control system $CS_X$ to said wind turbine $WT_X$ in order to shut down said wind turbine $WT_X$; as well as duration of such shut down;

timestamp and information associated with the specific condition causing instructions $IR_X$, being transmitted from said control system $CS_X$ to said wind turbine $WT_X$ in order to force said wind turbine to operate under reduced power production; as well as duration of such forced power reduced operation.

The information associated with the specific conditions causing instructions $IS_X$ and/or instructions $IR_X$, to be transmitted to the monitoring system MS from the control system $CS_X$ may be in the form of one or more codes $CI_X$ such as an error code or an alarm code, identifying such condition(s) in respect of wind turbine $WT_X$.

Moreover, as seen in FIG. 1, the monitoring system generates an operational report OR. This operational report OR sets out, in respect of each wind turbine $WT_X$, control instructions $CI_1$, $CI_2$, ... $CI_N$ relating to the control instruction $CI_X$ being transmitted from each control system $CS_X$ to the associated wind turbine $WT_X$.

The information relating to control instructions $CI_1$, $CI_2$, ... $CI_N$ being generated by the monitoring system MS in the form of an operational report includes the codes $C_1$, $C_2$, ... $C_N$, identifying the reason that a specific control system CSX has instructed the corresponding wind turbine $WT_X$ to shut down or to force said wind turbine to operate under reduced power production.

Along with the codes $C_1$, $C_2$, ... $C_N$, also included in the operational report are information relating to time stamps and duration of any shutting down or operation under reduced power production in respect of each specific wind turbine $WT_X$, associated with these codes.

In the wind farm WF illustrated in FIG. 1, each wind turbine $WT_X$ is being coupled to a master controller MC. The master controller MC is being configured to be able to transmit to the control system $CS_X$ of each of the wind turbines $WT_X$, a master instruction $MI_X$, overruling any control instructions $CI_X$ being transmitted from said control system $CS_X$ to said wind turbine $WT_X$. Hereby the master controller MC is able to shut down said wind turbine $WT_X$, or to force said wind turbine $WT_X$ to operate under reduced power production, irrespective which control instruction $CI_X$ said wind turbine $WT_X$ otherwise is receiving from its associated control system $CS_X$.

The master controller receives master instruction MI and on the basis of these master instructions MI, the master controller controls the overall operation of the wind turbines $WT_1$, $WT_2$, ... $WT_N$.

The master instructions may be provided by a human operator or by an automatic operation system.

For example, the master controller MC may receive master instructions from a human operator to shut down a specific wind turbine $WT_X$ because a physical inspection of the interior of its nacelle is about to be conducted.

Alternatively, the master controller MC may receive master instructions form an operation system which is coupled to a radar system. The radar system may detect presence of birds or bats in the vicinity of the wind farm and on the basis of the input from the radar system, the operation system may provide master instructions instructing one or more of the wind turbines $WT_X$ to overrule the instructions being provided by the corresponding control system $CS_X$, and thereby shut down these one or more wind turbines $WT_X$.

It is seen in FIG. 1 that each master instruction $MI_X$ being transmitted from the master controller MC to the control system $CS_X$ of a specific wind turbine $WT_X$ is being received by the monitoring system MS.

The master controller is configured to receive an annotation $A_X$ in respect of each wind turbine $WT_X$, upon providing master instructions $MI_X$ to the wind turbine $WT_X$.

The annotation $A_X$ is associated with the reason for making the master controller MC provide a master instruction $MI_X$, to said control system $CS_X$ with the view to shut down said wind turbine $WT_X$, or with the view to force said wind turbine $WT_X$, to operate under reduced power production.

Hereby, the monitoring system MS will be able to monitor the following information:
timestamp of and information relating to reason for providing any master instruction $MI_X$, being transmitted from said master controller MC to said control system $CS_X$ with the view to shut down said wind turbine $WT_X$, as well as duration of such shut down;
timestamp of and information relating to reason for providing any master instruction $MI_X$, being transmitted from said master controller to said control system $CS_X$ with the view to force said wind turbine $WT_X$, to operate under reduced power production, as well as duration of such forced power reduced operation.

Accordingly, the master controller MC may overrule the control of the wind turbine $WT_X$ by its associated control system $CS_X$.

As seen in FIG. 1 the monitoring system MS is configured to receive information $MI_1, MI_2, \ldots MI_X$ representing master instructions $MI_X$ being transmitted to each control system $CS_X$ of a wind turbine $WT_X$ with the view to overrule any control instruction $CI_X$ being transmitted from the control system $CS_X$ to the wind turbine $WT_X$.

The information $MI_1, MI_2, \ldots MI_X$ being transmitted form the master controller MC to the monitoring system MS comprises the annotations $A_1, A_2, \ldots A_N$, respectively.

As already mentioned, the monitoring system MS is configured to generate an operational report OR. This report OR also sets out information relating to the master instructions $M_1, M_2, \ldots M_N$ being transmitted from the master controller MC to the monitoring system MS and includes information relating to timestamp of and information relating to reasons for providing master instructions $MI_X$, forcing said wind turbine $WT_X$ to shut down, or to operate under reduced power production as well as duration of such shut down and/or of such forced operation under reduced power.

Such information relating to reasons for providing master instructions $MI_X$, forcing said wind turbine $WT_X$ to shut down, or to operate under reduced power production may be in the form of the annotations $A_X$.

Also seen in FIG. 1 is that master controller MC is configured to receive master instructions MI relating to how it is desired that the master controller behaves. The master instructions MI may be provided manually from a human individual or may be provided automatically from an IT system.

Finally, it is seen in FIG. 1 that the master controller is gaining information $CI_1, CI_2, \ldots CI_N$ as to the operation of each wind turbine $WT_X$, either from the monitoring system MS itself and alternatively or additionally from each individual control system $CS_X$, including any codes $C_1, C_2, \ldots C_N$ (relating to which specific condition has caused a control system $CS_X$ to make the corresponding wind turbine $WT_X$ shut down or operate under reduced power production), as indicated by the two dashed lines in FIG. 1.

The monitoring system MS of the present invention and specifically its generated operational report OR allows wind turbine and wind farm designers and engineers to gain a full picture of which conditions have caused any shut down or any forced operation under reduced power production of any wind turbine in the associated wind farm.

On the basis of such information, the manufactures and designers of wind turbine and wind parks will be able in respect of each specific environment encountered at any future wind farm project to optimize specific features and parameters of each wind turbine and components thereof as well as specific features and parameters relating to the wind farm itself.

Moreover, the monitoring system MS of the present invention and specifically its generated operational report OR gaining the full picture as to which reasons or conditions have caused any shut down or any forced operation under reduced power production, will allow a more correct allocations of profits resulting from power production of a wind farm between the owner of the wind farm and the operator of the wind farm, according to a predetermined contract.

It should be understood that all features and achievements discussed above and in the appended claims in relation to one aspect of the present invention and embodiments thereof apply equally well to the other aspects of the present invention and embodiments thereof.

LIST OF REFERENCES $WT_1$, $WT_2$, $WT_N$ Wind turbines
$CS_1$, $CS_2$, $CS_N$ Control system of wind turbine $WT_1$, $WT_2$, $WT_3$, respectively
$CI_1$, $CI_2$, $CI_N$ Control instruction transmitted from control system to wind turbine
$IS_1$, $IS_2$, $IS_N$ Control instruction, instructing wind turbine to shut down
$IR_1$, $IR_2$, $IR_N$ Control instruction, instructing wind turbine to operate under reduced power production
MC Master controller
MI Master instruction
$MI_1$, $MI_2$, $MI_N$ Master instruction transmitted from master controller to control system $CI_1$, $CI_2$, $CI_N$, respectively
MS Monitoring system
$OS_1$, $OS_2$, $OS_3$, $\ldots OS_M$ Operational sensor of wind turbine
WF Wind farm
OR Operational report
$A_1$, $A_2$, $A_N$ Annotations made to master instructions $MI_1$, $MI_2$, $MI_N$, respectively
$C_1$, $C_2$, $C_N$ Code identifying condition causing control system to shut down or to operate under reduced power production

The invention claimed is:

1. A monitoring system (MS) for monitoring the operation of a number N of wind turbines (WT1, WT2, . . . WTN); wherein N is an integer;
wherein each wind turbine (WTX) is controlled by an associated control system (CSX) in accordance with an array of predetermined control criteria by transmitting control instructions (CIX) from said control system (CSX) to said wind turbine (WTX);
wherein in respect of said wind turbine (WTX), one or more of said control instructions (CIX) is/are an instruction (ISX), instructing said wind turbine (WTX) to shut down, and/or wherein one or more of said one or more of said control instructions (CIX) is/are an instruction (IRX), instructing said wind turbine (WTX) to operate under reduced power production;

wherein each said wind turbine is coupled to a master controller (MC), wherein said master controller (MC) is configured to be able to transmit to the control system (CSX) associated with one or more of said wind turbines (WTX), a master instruction (MIX), overruling control instructions (CIX) transmitted from said control system (CSX) to said wind turbine (WTX) with the view to shut down said wind turbine (WTX) or with the view to force said wind turbine (WTX) to operate under reduced power production;

wherein said monitoring system (MS), in respect of each wind turbine (WTX), is configured to receive and log from the corresponding control system (CSX) the following information:

timestamp and information associated with the specific condition causing instructions (ISX), to be transmitted from said control system (CSX) to said wind turbine (WTX) in order to shut down said wind turbine (WTX); as well as duration of such shut down;

timestamp and information associated with the specific condition causing instructions (IRX), is transmitted from said control system (CSX) to said wind turbine (WTX) in order to force said wind turbine to operate under reduced power production; as well as duration of such forced power reduced operation;

wherein said monitoring system (MS), in respect of each wind turbine (WTX), is configured to receive and log from said master controller (MC), the following information:

timestamp of and information relating to reason for providing master instructions (MIX), is transmitted from said master controller (MC) to said control system (CSX) with the view to shut down said wind turbine (WTX), as well as duration of such shut down;

timestamp of and information relating to reason for providing master instructions (MIX), is transmitted from said master controller to said control system (CSX) with the view to force said wind turbine (WTX), to operate under reduced power production, as well as duration of such forced power reduced operation;

wherein said monitoring system (MS) is configured to generate an operational report (OR);

wherein said operational report (OR) sets out, in respect of each wind turbine (WTX), time stamps of and information associated with specific conditions causing instructions (ISX), shutting down said wind turbine (WTX), and/or instructions (IRX) forcing said wind turbine (WTX) to operate under reduced power production, as well as duration of such shut down and/or of such forced operation under reduced power;

wherein said operational report (OR) sets out, in respect of each wind turbine (WTX), timestamp of and information relating to reasons for providing master instructions (MIX), forcing said wind turbine (WTX) to shut down, or to operate under reduced power production as well as duration of such shut down and/or of such forced operation under reduced power.

2. A monitoring system (MS) according to claim 1, wherein in respect of one or more of said wind turbines (WTX), said wind turbine (WTX) comprises a number M of operational sensors (OS1, OS2, OS3, . . . OSM), wherein each specific operational sensor (OSX) is configured to provide information to said control system (CSX) relating to one or more parameters of operation of said wind turbine (WTX) and wherein said control system (CSX); is configured to provide said instruction (ISX), which instructs said wind turbine (WTX) to shut down, and/or said instruction (IRX), which instructs said wind turbine (WTX) to operate under reduced power production, on the basis of input from one or more of said operational sensors (OS1, OS2, OS3, . . . OSM), and according to predetermined operational criteria.

3. A monitoring system (MS) according to claim 2, wherein said operational sensors (OS1, OS2, OS3, . . . OSM), is/are selected from a group of sensors for sensing one or more of the following parameters: maintenance parameters; internal parameters; pressure of hydraulic oil; ambient parameters; severe weather conditions; and grid parameters.

4. A monitoring system (MS) according to claim 1, wherein said N wind turbines form part of a wind farm located within a predetermined area, wherein said master controller (MC) is coupled to one or more of said control systems (CSX) associated with said wind turbines (WTX) of said wind farm.

5. A monitoring system (MS) according to claim 1, wherein in respect of each wind turbine (WTX), said information associated with specific conditions causing instructions (ISX), which instructs said wind turbine (WTX) to shut down and/or instructions (IRX), which instructs said wind turbine (WTX) to operate under reduced power production, to be transmitted to said monitoring system (MS) from said control system (CSX) relates to information specifying which type of parameter(s) and/or parameter values has/have caused said control system to transmit to said wind turbine (WTX), said instruction (ISX), which instructs said wind turbine (WTX) to shut down and/or instruction (IRX), which instructs said wind turbine (WTX) to operate under reduced power production.

6. A monitoring system (MS) according to claim 1 wherein in respect of each wind turbine (WTX), said information associated with specific conditions causing instructions (ISX), which instructs said wind turbine (WTX) to shut down and/or instructions (IRX), which instructs said wind turbine (WTX) to operate under reduced power production, to be transmitted to said monitoring system (MS) from said control system (CSX) is in the form of one or more codes (CX), identifying such condition(s).

7. A monitoring system (MS) according to claim 6, wherein, in respect of each wind turbine (WTX), said monitoring system (MS) is configured to generate said operational report (OR), wherein said operational report OR includes such code(s) (CX), identifying the specific conditions causing instructions (ISX), which instructs said wind turbine (WTX) to shut down and/or instructions (IRX), which instructs said wind turbine (WTX) to operate under reduced power production, to be transmitted to said monitoring system (MS) from said control system (CSX).

8. A monitoring system (MS) according to claim 1, wherein said master controller (MC) is configured to receive a master inputs (MI) from a human operator or from an operating system, wherein said master input (MI) relates to operational instructions for operating said master controller (MC).

9. A monitoring system (MS) according to claim 1, wherein in respect of each said wind turbine (WTX), said master controller (MC) is configured to, along with the receival of a master instruction (MI), to receive an annotation (AX) associated with the reason for making the master controller (MC) provide a master instruction (MIX), to said control system (CSX) with the view to shut down said wind turbine (WTX), or with the view to force said wind turbine (WTX), to operate under reduced power production.

10. A monitoring system (MS) according to claim 1, wherein in respect of each wind turbine (WTX), said annotation (AX), associated with a master instruction (MIX) transmitted from said master controller (MC) to one or more control systems (CSX) associated with said wind turbine (WTX), is selected from the following group of annotations:
   an annotation relating to a first type of master instructions provided in accordance with one or more predetermined safety criteria;
   an annotation relating to a second type of master instructions provided in accordance with one or more safety criteria caused by an acutely encountered risk situation;
   an annotation relating to a third type of master instructions provided in accordance with one or more manually defined criteria.

11. A monitoring system (MS) according to claim 1, wherein said master instruction (MIX) is transmitted from said master controller (MC) to the control system (CSX) associated said wind turbine (WTX), in order to shut down said wind turbine (WTX), or in order to force said wind turbine (WTX) to operate under reduced power production relates to one of the following concerns or reasons:
   A-Trading;
   B-Grid parameters;
   C-Avian;
   D-Noise;
   E-Shadow;
   F-Sector management;
   G-Icing;
   H-Maintenance;
   I-Severe weather conditions.

12. A monitoring system (MS) according to claim 11, wherein in respect of each said wind turbines (WTX), said monitoring system (MS) is configured to receive said annotation (AX) along with said master instruction (MIX), thereby transmitting to said monitoring system (MS), the reason for shutting down said wind turbine (WTX), or the reason to operate said wind turbine (WTX) under reduced power production, as expressed by said annotation (AX).

13. A monitoring system (MS) according to claim 12, wherein, in respect of each wind turbine (WTX), said monitoring system (MS) is configured to generate said operational report (OR), wherein said operational report (OR) includes such annotation (AX), identifying the specific reason(s) for transmitting said master instruction (MIX) from said master controller (MC) to said control system (CSX), with the view to shut down said wind turbine (WTX), or with the view to force said wind turbine (WTX) to operate under reduced power production.

14. A monitoring system (MS) according to claim 1, wherein said monitoring system (MS) is configured to transmit to said master controller (MC), control information relating to the operation of one or more, preferably all said wind turbines (WTX).

15. A monitoring system (MS) according to claim 1, wherein one or more of said control systems (CSX) is/are configured to transmit to said master controller (MC), control information relating to the operation of the associated wind turbine (WTX).

16. A wind farm (WF) comprising:
   a number N of wind turbines (WT1, WT2, ... WTN), wherein N is an integer;
   a monitoring system (MS);
   a master controller (MC);
   wherein each said wind turbine (WTX) is controlled by an associated control system (CSX), wherein said control system (CSX) is configured to operate said wind turbine (WTX) in accordance with an array of predetermined control criteria by transmitting control instructions (CIX) from said control system (CSX) to said wind turbine (WTX); wherein in respect of said wind turbine (WTX), one or more of said control instructions (CIX) is/are an instruction (ISX), instructing said wind turbine (WTX) to shut down, and/or wherein one or more of said one or more of said control instructions (CIX) is/are an instruction (IRX), instructing said wind turbine (WTX) to operate under reduced power production;
   wherein the control system (CSX) of each said wind turbine (WTX) is coupled to said master controller (MC), wherein said master controller (MC) is configured to be able to transmit to one or more of said control systems (CSX) of said wind turbines (WTX), a master instruction (MIX), overruling control instructions (CIX, ISX, IRX) is transmitted from said control system (CSX) to said wind turbine (WTX) with the view to shut down said wind turbine (WTX) or with the view to force said wind turbine (WTX) to operate under reduced power production;
   wherein said monitoring system (MS) is configured as set out in claim 1.

17. A method for monitoring the operation of a number N of wind turbines (WT1, WT2, ... WTN), wherein N is an integer; said method comprises:
   i) providing a number N of wind turbines (WT1, WT2, ... WTN), N being an integer, wherein each wind turbine (WTX) is controllable by an associated control system (CSX) in accordance with an array of predetermined control criteria by transmitting control instructions (CIX) from said control system (CSX) to said wind turbine (WTX); wherein in respect of said wind turbine (WTX), one or more of said control instructions (CIX) is/are an instruction (ISX), instructing said wind turbine (WTX) to shut down, and/or wherein one or more of said one or more of said control instructions (CIX) is/are an instruction (IRX), instructing said wind turbine (WTX) to operate under reduced power production;
   ii) providing a master controller (MC), wherein in respect of each said wind turbines (WTX), said control system (CSX) of said wind turbine (WTX) is coupled to said master controller (MC), wherein said master controller (MC) is configured to be able to transmit to one or more of said control systems (CSX) of said wind turbines (WTX), a master instruction (MIX), overruling control instructions (CIX, ISX, IRX) are transmitted from said control system (CSX) to said wind turbine (WTX) with the view to shut down said wind turbine (WTX) or with the view to force said wind turbine (WTX) to operate under reduced power production;
   iii) providing a monitoring system (MS), wherein said monitoring system (MS), in respect of each wind turbine (WTX), is configured to receive and log from the corresponding control system (CSX) the following information:
   timestamp and information associated with the specific condition causing instructions (ISX), to be transmitted from said control system (CSX) to said wind turbine (WTX) in order to shut down said wind turbine (WTX); as well as duration of such shut down;
  timestamp and information associated with the specific condition causing instructions (IRX), transmitted from said control system (CSX) to said wind turbine (WTX) in order to force said wind turbine to operate under reduced power production; as well as duration of such forced power reduced operation; and
wherein said monitoring system (MS), in respect of each wind turbine (WTX), is configured to receive and log from the master controller (MC), the following information:
  timestamp of and information relating to reason for providing master instructions (MIX), transmitted from said master controller (MC) to said control system (CSX) in order to shut down said wind turbine (WTX), as well as duration of such shut down;
  timestamp of and information relating to reason for providing master instructions (MIX), transmitted from said master controller (MC) to said control system (CSX) in order to force said wind turbine (WTX), to operate under reduced power production, as well as duration of such forced power reduced operation;
iv) operating each said wind turbines (WTX), by controlling said wind turbine by said corresponding control system (CSX); and by allowing, whenever considered necessary, said master controller (MC) to transmit to one or more of the control system (CSX) associated with said wind turbine (WTX), a master instruction (MIX), overruling control instructions (CIX) transmitted from said control system (CSX) to said wind turbine (WTX) with the view to shut down said wind turbine (WTX) or with the view to force said wind turbine (WTX) to operate under reduced power production;
v) making said monitoring system (MS) generate an operational report (OR);
wherein said operational report (OR) sets out, in respect of each wind turbine (WTX), time stamps of and information associated with the specific condition causing instructions (ISX), shutting down said wind turbine (WTX), and/or instructions (IRX) forcing said wind turbine (WTX) to operate under reduced power production, as well as duration of such shut down and/or of such forced operation under reduced power;
and wherein said operational report sets out, in respect of each wind turbine (WTX), timestamp of and information relating to reason for providing master instructions (MIX), forcing said wind turbine (WTX), to shut down, or to operate under reduced power production as well as duration of such shut down and/or of such forced operation under reduced power.

18. A method according to claim 17, wherein said monitoring system (MS) for monitoring the operation of a number N of wind turbines (WT1, WT2, . . . WTN); wherein N is an integer;
  wherein each wind turbine (WTX) is controlled by an associated control system (CSX) in accordance with an array of predetermined control criteria by transmitting control instructions (CIX) from said control system (CSX) to said wind turbine (WTX);
  wherein in respect of said wind turbine (WTX), one or more of said control instructions (CIX) is/are an instruction (ISX), instructing said wind turbine (WTX) to shut down, and/or wherein one or more of said one or more of said control instructions (CIX) is/are an instruction (IRX), instructing said wind turbine (WTX) to operate under reduced power production;
  wherein each said wind turbine is coupled to a master controller (MC), wherein said master controller (MC) is configured to be able to transmit to the control system (CSX) associated with one or more of said wind turbines (WTX), a master instruction (MIX), overruling control instructions (CIX) transmitted from said control system (CSX) to said wind turbine (WTX) with the view to shut down said wind turbine (WTX) or with the view to force said wind turbine (WTX) to operate under reduced power production;
  wherein said monitoring system (MS), in respect of each wind turbine (WTX), is configured to receive and log from the corresponding control system (CSX) the following information:
    timestamp and information associated with the specific condition causing instructions (ISX), to be transmitted from said control system (CSX) to said wind turbine (WTX) in order to shut down said wind turbine (WTX); as well as duration of such shut down;
    timestamp and information associated with the specific condition causing instructions (IRX), is transmitted from said control system (CSX) to said wind turbine (WTX) in order to force said wind turbine to operate under reduced power production; as well as duration of such forced power reduced operation;
  wherein said monitoring system (MS), in respect of each wind turbine (WTX), is configured to receive and log from said master controller (MC), the following information:
    timestamp of and information relating to reason for providing master instructions (MIX), is transmitted from said master controller (MC) to said control system (CSX) with the view to shut down said wind turbine (WTX), as well as duration of such shut down;
    timestamp of and information relating to reason for providing master instructions (MIX), is transmitted from said master controller to said control system (CSX) with the view to force said wind turbine (WTX), to operate under reduced power production, as well as duration of such forced power reduced operation;
  wherein said monitoring system (MS) is configured to generate an operational report (OR);
  wherein said operational report (OR) sets out, in respect of each wind turbine (WTX), time stamps of and information associated with specific conditions causing instructions (ISX), shutting down said wind turbine (WTX), and/or instructions (IRX) forcing said wind turbine (WTX) to operate under reduced power production, as well as duration of such shut down and/or of such forced operation under reduced power;
  wherein said operational report (OR) sets out, in respect of each wind turbine (WTX), timestamp of and information relating to reasons for providing master instructions (MIX), forcing said wind turbine (WTX) to shut down, or to operate under reduced power production as well as duration of such shut down and/or of such forced operation under reduced power.

19. A non-transitory computer-readable medium comprising a computer program product, which when loaded on a computer is configured to carry out the method according to claim 17.

* * * * *